T. A. PERRY.
GASOLENE TANK AND FILLER THEREFOR.
APPLICATION FILED SEPT. 29, 1916.
1,259,773.
Patented Mar. 19, 1918.
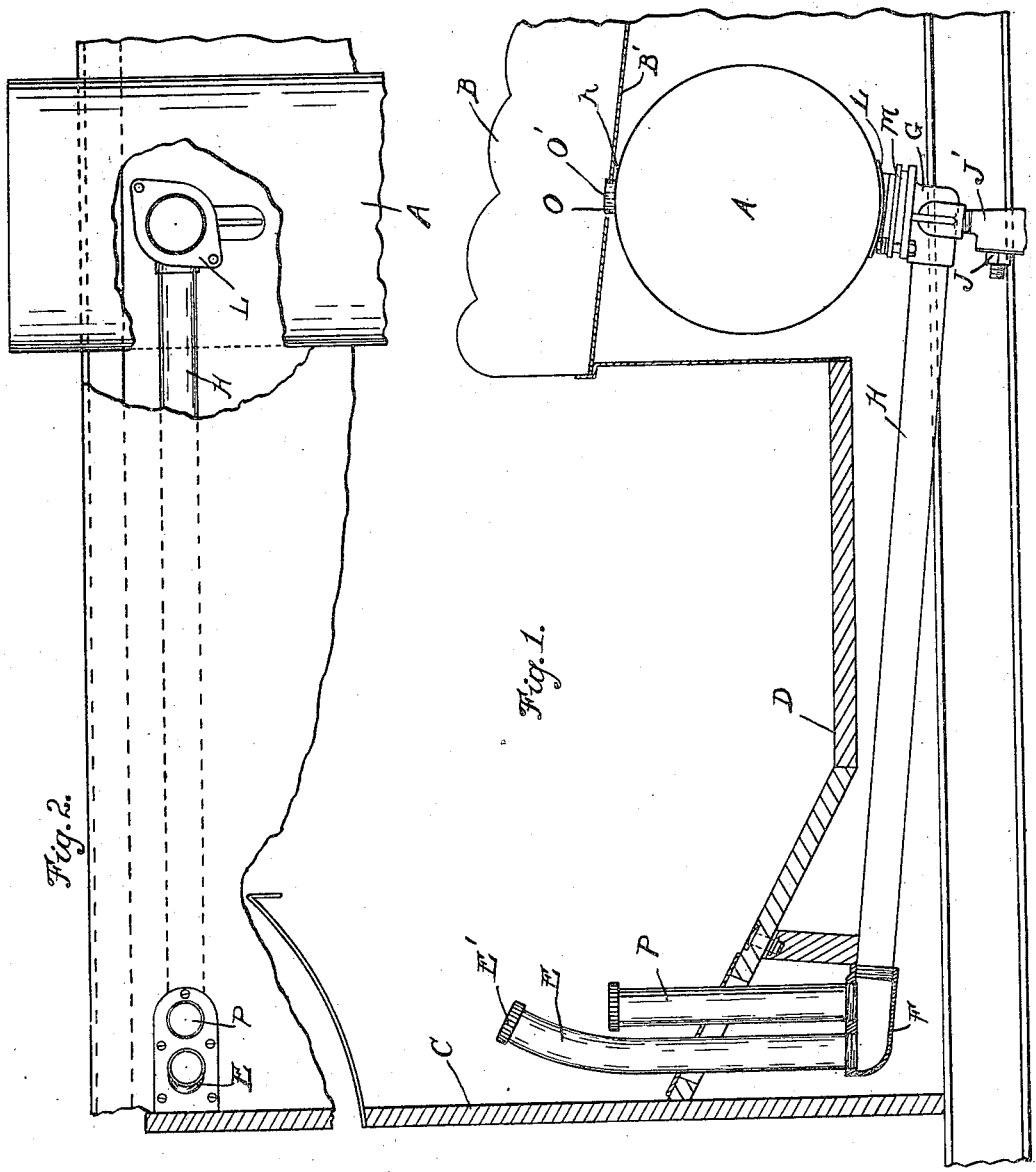
Inventor
Tony A. Perry

UNITED STATES PATENT OFFICE.

TONY A. PERRY, OF DETROIT, MICHIGAN.

GASOLENE-TANK AND FILLER THEREFOR.

1,259,773.

Specification of Letters Patent. Patented Mar. 19, 1918.

Application filed September 29, 1916. Serial No. 122,861.

*To all whom it may concern:*

Be it known that I, TONY A. PERRY, a citizen of the United States of America, residing at Detroit, in the county of Wayne and State of Michigan, have invented certain new and useful Improvements in Gasolene-Tanks and Fillers Therefor, of which the following is a specification, reference being had therein to the accompanying drawings.

This invention relates to gasolene tanks and the filling arrangement for such tanks, and refers more particularly to a construction of this character adapted for use in automobiles or the like.

Among the objects of the invention are to provide a means for filling a tank which is located beneath a seat without removing the latter; to provide an attachment which can be connected to tanks now in use without the necessity of drilling holes or in any other manner materially changing the tank or its connections; to utilize the normal filler opening of the tank by inverting the tank and connecting a filler pipe with such opening; and in general to provide a new and improved arrangement for filling gasolene tanks which are located beneath the seat or at other inaccessible positions such as where the space at the top is limited.

In the drawings:

Figure 1 is a vertical sectional view through the front part of an automobile to which my invention has been applied;

Fig. 2 is a fragmentary top plan view of the filler connection.

Describing in detail the particular embodiment of my invention shown in the drawings, A designates the gasolene tank which is mounted beneath the front seat B, while C designates the dash and D the front floor. As shown in Fig. 1 there is little clearance between the top of the tank A and the lower surface B' of the seat. In certain types of cars it is usual to fill the tank by removing the front seat cover and my invention contemplates an arrangement where the tank now in use in such cars can be filled without removing the front seat or disturbing the occupants of the front seat. For this purpose I preferably utilize a filler pipe E which is connected by couplings F and G and a connecting pipe H to the gasolene tank. In the present construction the gasolene feed line J and its coupling J' are disconnected from the bottom of the tank and the latter inverted so that the normal feed line connection K is at the top and the filler opening L at the bottom. The usual filler cap is removed and there is substituted therefor a threaded connection M to which there is bolted the coupling G into the bottom of which is connected the coupling J' of the gasolene feed line. A suitable plug O having vent openings O' is fastened in the normal feed line connection K which is now located at the top of the tank.

In filling the tank the filler cap E' is removed and the gasolene poured into the pipe E from which it flows through the pipe H to the gasolene tank. In the preferred form the coupling F is also provided with a gasolene gage P by which the operator can observe the amount of gasolene in the tank without lifting the seat cover. It will be noticed that no additional holes for the couplings are formed in the tank and that the entire device can be applied to a standard construction without changing the latter other than to invert the tank. While I have shown the filler pipe and gage as located near the dash, the invention is not necessarily limited to this arrangement, since various changes in this and other details of construction can be made within the scope of my invention.

What I claim as my invention is:

1. The combination with a seat, of a fuel tank located beneath the seat and having a relatively large filler opening normally positioned at the top of the tank, and a feed line having a normal connection into the lower part of said tank, of means for filling said tank comprising means for supporting the tank in inverted position, a vent plug connected into the normal feed line connection, and a filler member extending to the bottom portion of the tank and connected into the normal filler opening, and positioned between the latter and the normal feed line connection.

2. The combination with a tank located in a covered position and having a filler opening normally positioned at the top of the tank and a fuel line having a normal connection into the lower part of said tank, of means for filling said tank comprising means for supporting the tank in inverted position, and a filler connection leading to the bottom portion of the tank and connecting into the normal filler opening, the feed line also connecting into the tank through said normal filler opening.

In testimony whereof I affix my signature.

TONY A. PERRY.

Copies of this patent may be obtained for five cents each, by addressing the "Commissioner of Patents, Washington, D. C."